US008785510B2

(12) United States Patent
Vo et al.

(10) Patent No.: US 8,785,510 B2
(45) Date of Patent: Jul. 22, 2014

(54) ALKENYL AROMATIC FOAM WITH LOW SOLUBILITY HYDROFLUOROCARBON

(75) Inventors: Van-Chau Vo, Souffelweyersheim (FR); Richard T. Fox, Midland, MI (US); Warren H. Griffin, Saginaw, MI (US); John Gordon-Duffy, La Wantzenau (FR); Lawrence S. Hood, Midland, MI (US); Roy E. Smith, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 386 days.

(21) Appl. No.: 12/531,518

(22) PCT Filed: Mar. 13, 2008

(86) PCT No.: PCT/US2008/056774

§ 371 (c)(1), (2), (4) Date: Sep. 16, 2009

(87) PCT Pub. No.: WO2008/130749

PCT Pub. Date: Oct. 30, 2008

(65) Prior Publication Data

US 2010/0099783 A1 Apr. 22, 2010

Related U.S. Application Data

(60) Provisional application No. 60/923,616, filed on Apr. 16, 2007.

(51) Int. Cl.

*C08J 9/00* (2006.01)
*C08J 9/12* (2006.01)
*C08J 9/14* (2006.01)

(52) U.S. Cl.

CPC .................. *C08J 9/127* (2013.01); *C08J 9/144* (2013.01); *C08J 9/146* (2013.01); *C08J 9/149* (2013.01); *C08J 2203/06* (2013.01); *C08J 2201/03* (2013.01); *C08J 2203/144* (2013.01); *C08J 2203/14* (2013.01); *C08J 2203/142* (2013.01); *C08J 2325/08* (2013.01); *C08J 2325/12* (2013.01); *C08J 2325/06* (2013.01)

USPC .............................. 521/98; 521/146; 521/147

(58) Field of Classification Search

CPC ............ C08J 9/141–9/144; C08J 9/146; C08J 2325/06; C08J 2325/08; C08J 2325/12; C08J 2335/06; C08J 9/127; C08J 9/149; C08J 2201/03; C08J 2203/06; C08J 2203/14; C08J 2203/142; C08J 2203/144

USPC ............................................ 521/98, 146, 147

See application file for complete search history.

(56) References Cited

U.S. PATENT DOCUMENTS

| | | | |
|---|---|---|---|
| 4,323,528 | A | 4/1982 | Collins |
| 5,011,866 | A | 4/1991 | Suh |
| 5,147,896 | A | 9/1992 | York |
| 5,204,169 | A | 4/1993 | York |
| 6,063,823 | A | 5/2000 | Nakatani et al. |
| 6,225,364 | B1 | 5/2001 | Chaudhary et al. |
| 6,274,640 | B1 | 8/2001 | Miller et al. |
| 2010/0099783 | A1 | 4/2010 | Vo et al. |

FOREIGN PATENT DOCUMENTS

| | | |
|---|---|---|
| DE | 19637366 | 3/1998 |
| EP | 1479717 | 4/2004 |
| EP | 1214372 B1 | 12/2005 |
| JP | 7165970 | 6/1995 |
| JP | 8059877 | 3/1996 |
| JP | 2000119434 | 4/2000 |
| JP | 200523243 | 1/2005 |
| JP | 2010525107 | 7/2010 |
| WO | WO-98/03581 | 1/1998 |
| WO | WO-98/32787 | 7/1998 |
| WO | 2006053029 | 5/2006 |

OTHER PUBLICATIONS

R. Gendron, et al., "Foam Extrusion of PS Blown with a Mixture of HFC-134a and Isopropanol," Journal of Cellular Polymers. 23(1) 2004, 1-23.

Presentation by Bertrand Kieken, "Processability of HFC-134a in PS Foaming: Effect of Resin Structure" at the FoamTech Meeting dated Dec. 6, 2001.

C. Vachon and R. Gendron, "Foaming Polystyrene with Mixtures of Carbon Dioxide and HFC-134a", Cellular Polymer. 22 (2) 2003, 75-87.

C. Vachon, et al, PS Foams Made From Blends of CO2 and HFC 134a, Foam Tech Meeting, Dec. 7, 2000.

*Primary Examiner* — Irina S Zemel
(74) *Attorney, Agent, or Firm* — Steven W. Mork

(57) ABSTRACT

Prepare a closed-cell alkenyl aromatic polymer foam by an extrusion process using a blowing agent composition that contains at least 30 weight-percent of the chlorine-free hydrofluorocarbon blowing agent such that the foam has a density of 48 kilograms per cubic meter or less, contains more than 50 weight-percent styrene-acrylonitrile copolymer based on total polymer weight and at least eight weight-percent of a chlorine-free hydrofluorocarbon blowing agent that has a lower solubility in polystyrene than 1,1,2,2-tetrafluoroethane (HFC-134).

8 Claims, No Drawings

ALKENYL AROMATIC FOAM WITH LOW SOLUBILITY HYDROFLUOROCARBON

CROSS REFERENCE STATEMENT

This application claims the benefit of U.S. Provisional Application No. 60/923,616 filed Apr. 16, 2007.

BACKGROUND OF THE INVENTION

1. Field of the Invention

The present invention relates to a closed cell alkenyl aromatic polymer foam containing a low solubility chlorine-free hydrofluorocarbon blowing agent, a process for preparing such a foam and a method for using such a foam.

2. Description of Related Art

Chlorine-free hydrofluorocarbon (HFC) blowing agents are desirable for use in preparing polymer foam because they offer both low thermal conductivity and low environmental hazards in regards to ozone depletion. However, chlorine-free HFCs that are available in commercially viable quantities tend to have little solubility in alkenyl aromatic polymers such as polystyrene. Therefore, use of such chlorine-free HFCs in polystyrene foam is typically limited to less than eight weight-percent HFC based on total polymer foam weight in order to obtain a foam having good physical properties (for example, that is closed celled, has a density of 48 kilograms per cubic meter (kg/m$^3$) or less and preferably is free of blow holes and preferably has a good skin quality).

PCT publication WO 98/03581 and U.S. Pat. No. 6,255,364 disclose preparing alkenyl aromatic foam with a blowing agent containing 70-95 wt percent (%) 1,1,2,2 tetrafluoroethane (HFC-134). Both references disclose an ability to achieve a closed cell foam having a density less than 48 kg/m$^3$ using HFC-134 as a principle blowing agent. HFC-134 is a particularly attractive blowing agent because it has a relatively high solubility in alkenyl aromatic polymers. As WO 98/03581 notes, higher blowing agent solubility in a resin is advantageous by providing conditions for foam formation which are conducive to closed cell production over a wide range of densities while minimizing the possibility of blown/ruptured cells (see page 12, lines 22-27). Unfortunately, HFC-134 is not readily available on a commercial market, leaving less soluble chlorine-free HFCs as commercially viable blowing agent options.

Blowing agents that are less soluble than 134, however, are not especially conducive as blowing agents. For example, 1,1,1,2-tetrafluoroethane (HFC-134a) is a chlorine-free HFC that is commercially available but that is less soluble in polystyrene than HFC-134. Examples exist demonstrating use of HFC-134a as a blowing agent for styrenic foams but only at concentrations up to about 7.5 wt % based on polymer weight. (see, for example, European Patent 1214372B1). Use of HFC-134a at concentrations above 7 wt % reportedly produces poor quality foam due to blowholes, low expansion, open cells and a high nucleation rate. (as reported in a presentation by Bertrand Kieken entitled "Processability of HFC-134a in PS Foaming: Effect of Resin Structure" at the FoamTech Meeting dated 6 Dec. 2001). Foams are reportedly "hardly attainable" when using a blowing agent consisting of HFC-134a at concentrations above 7.5 wt %. (see, R. Gendron, et al., "Foam Extrusion of PS Blown with a Mixture of HFC-134a and Isopropanol", *JOURNAL OF CELLULAR PLASTICS* 23(1) 2004, 1-23). Such problems are common with blowing agents having a low solubility in the polymer they are foaming.

U.S. Pat. No. 6,274,640 ('640) discloses a method for increasing solubility of HFC-134a in polystyrene for producing polymer foam by including an alcohol as a co-blowing agent. '640 discloses blowing agent compositions that contain from 4-8 wt % HFC-134a based on polymer weight.

U.S. Pat. No. 6,063,823 ('823) discloses that the solubility of an HFC into polystyrene increases upon blending into polystyrene an additional polymer containing oxygen, nitrogen or fluorine. However, '823 is clear to point out that blending more than 30 wt % of additional polymer into polystyrene provides no further improvement and in fact causes adverse effects to the physical properties of the resulting foam.

PCT publication WO 98/32787 offers a method to improve HFC solubility in an olefinic polymer (in which they include polystyrene) by adding a polar polymer having a low molecular weight and ability to dissolve the blowing agent when heat plasticized. The publication focuses primarily on acrylates as suitable polar polymers and specifically limits the amount of polar polymer to 50 wt % or less of the total polymer blend.

An opportunity exists to advance the art of insulating foam technology by identifying a process for preparing a closed cell, low density alkenyl aromatic polymer foam using a blowing agent comprising more than 30 wt % of a readily available chlorine-free HFC such as 1,1,1,2-tetrafluoroethane (HFC-134a) for a total chlorine-free HFC concentration of 8 wt % or more while maintaining quality foam physical properties.

BRIEF SUMMARY OF THE INVENTION

The present invention offers a solution to the aforementioned opportunity both in the form of an alkenyl aromatic foam and a process for preparing the foam.

Surprisingly, the process of the present invention can use a blowing agent composition containing at least 30 wt % based on blowing agent weight and at least eight wt % based on polymer weight of a chlorine-free HFC having a solubility in polystyrene less than that of HFC-134 in a temperature range of 100 degrees Celsius (° C.) to 200° C., preferably 25° C. to 100° C. to prepare an alkenyl aromatic polymer foam of the present invention that is close-celled, has a density of 48 kg/m$^3$ or less, has good physical properties and contains at least eight wt % of the chlorine-free HFC. Determine solubility in polystyrene at a pressure between one and 100 bar (one and 98 atmospheres). It is further surprising that such a process is capable of preparing a foam with a cell size of 0.05 mm or more, especially with an average cell size of 0.1 mm or more.

In a first aspect, the present invention is a process for preparing extruded polymer foam comprising the steps: (a) preparing a foamable mixture of a thermoplastic polymer composition and blowing agent at a mixing temperature and mixing pressure; (b) cooling the foamable mixture to a foaming temperature; and (c) exposing the foamable mixture to an environment at a lower pressure than the mixing pressure and allowing the foamable mixture to expand into a polymer foam; wherein, more than 50 wt % of the thermoplastic polymer composition is one or more styrene-acrylonitrile copolymer and wherein one or more chlorine-free hydrofluorocarbon (HFC) blowing agent is present at a concentration of more than 30 weight-percent based on total blowing agent weight and at least eight weight-percent based on thermoplastic polymer composition weight; each of the one or more chlorine-free HFC blowing agent(s) having a solubility in polystyrene that is less than that of 1,1,2,2-tetrafluoroethane in a temperature range of 100° C.-200° C. at a pressure between one and 100 bar as determined by the Flory-Huggins equation for phase equilibria in polymer solutions.

Preferred embodiments of the first aspect include any one or combination of the following characteristics: at least 95 wt % of the thermoplastic polymer composition is selected from a group consisting of styrene-acrylonitrile copolymers (SAN) and polystyrene or is SAN; the thermoplastic polymer composition contains one weight-percent or more and 35 weight-percent or less of copolymerized acrylonitrile based on thermoplastic polymer composition weight; the chlorine-free HFC is 1,1,1,2-tetrafluoroethane (HFC-134a); the blowing agent consist of 50 weight-percent or more of the chlorine-free HFC and up to 50 weight-percent of a co-blowing agent selected from a group consisting of carbon dioxide, water, hydrocarbons having from one to seven carbons, alcohols having from two to five carbons, ether and ketones having from two to four carbons; the blowing agent consists of the one or more chlorine-free HFC; the polymer foam has an open-cell content of less than 30 percent according to ASTM method D6226-05 and has a density of 48 kilograms per cubic meter or less according to ISO method 845-85; the polymer foam has an average cell size of 0.1 millimeters or more; and the chlorine-free HFC has a solubility in polystyrene that is less than that of 1,1,2,2-tetrafluoroethane in a temperature range of 25° C.-200° C. at a pressure between one and 100 bar as determined by the Flory-Huggins equation for phase equilibria in polymer solutions.

In a second aspect, the present invention is an extruded polymer foam comprising a thermoplastic polymer composition defining a plurality of cells therein, characterized by: (a) more than 50 weight-percent of the thermoplastic polymer composition being a styrene-acrylonitrile copolymer; (b) having less than 30% open cell content according to ASTM method D6226-05; (c) having a density of 48 kilograms per cubic meter or less according to ISO method 845-85; and (d) containing at least eight weight-percent, based on total foam weight, of one or more chlorine-free hydrofluorocarbon (HFC) each of which has a lower solubility in polystyrene in a temperature range between 100 degrees Celsius and 200 degrees Celsius than 1,1,2,2-tetrafluoroethane (HFC-134) at a pressure between one and 100 bar as determined by the Flory-Huggins equation for phase equilibria in polymer solutions.

Preferred embodiments of the second aspect include any one or combination of the following characteristics: the foam having at least one primary surface and further characterized by having 98% or more of any 200 square-centimeter portion of any primary surface of the foam that is centered on the foam's primary surface and extending to 80% of the foam's width free of defects; the foam has a density of 16 kilograms per cubic meter or more and 48 kilograms per cubic meter or less according to ISO method 845-85; at least 95 weight-percent of the thermoplastic polymer composition is selected from a group consisting of styrene-acrylonitrile copolymer and polystyrene; at least 95 weight-percent of the thermoplastic polymer composition is one or more styrene-acrylonitrile copolymer; the thermoplastic polymer composition contains one weight-percent or more and 35 weight-percent or less of copolymerized acrylonitrile based on thermoplastic polymer composition weight; the one or more chlorine-free HFC has a solubility in polystyrene that is less than that of 1,1,2,2-tetrafluoroethane in a temperature range of 25° C.-200° C. at a pressure in a range of one to 100 bar as determined by the Flory-Huggins equation for phase equilibria in polymer solutions; the one or more chlorine-free HFC is 1,1,1,2-tetrafluoroethane (HFC-134a); the polymer foam has an average cell size of 0.1 millimeters or more; and the blowing agent consists of the one or more chlorine-free HFC.

In a third aspect, the present invention is a method of using the polymer foam of the second aspect comprising the step of positioning the polymer foam between two areas where one of the two areas experiences a different temperature than the other and such that the polymer foam can serve as a thermal insulator between the two areas.

The present invention offers a thermally insulating alkenyl aromatic foam containing a large concentration (greater than eight wt % based on foam weight) of an environmentally friendly chlorine-free HFC that has a lower solubility than HFC-134.

DETAILED DESCRIPTION OF THE INVENTION

Process

The process of the present invention is useful for preparing the polymer foam of the present invention. The process generally follows any extrusion foam process suitable for thermoplastic polymer fabrication. A suitable extrusion process typically follows three general steps: (a) preparing a foamable mixture comprising a thermoplastic polymer composition and a blowing agent at a mixing temperature and mixing pressure: (b) cooling the foamable mixture to a foaming temperature; and (c) exposing the foamable mixture to an environment at a lower pressure than the mixing pressure and allowing the foamable mixture to expand into a polymer foam. In general, the present process is not limited to a specific type of extrusion process.

The foamable mixture of the present process comprises a specific thermoplastic polymer composition, which is the same thermoplastic polymer composition in the foam of the present invention. The thermoplastic polymer composition contains styrene-acrylonitrile copolymer (SAN) at a concentration of more than 50 weight-percent (wt %), preferably 75 wt % or more, more preferably 90 wt % or more and can be 95 wt % or more, and can be even 100 wt % relative to the total weight of the thermoplastic polymer composition. The SAN copolymer can be a graft copolymer or copolymerized block copolymer or a random copolymer. Despite teaching in U.S. Pat. No. 6,063,823 to the contrary, use of this much SAN surprisingly produces a good quality foam with low density (48 kg/m$^3$ or less), good skin quality and a closed-cell structure.

Typically, the weight-averaged molecular weight (Mw) of the SAN and, desirably, any additional polymer in the polymer foam is 40,000 or more, preferably 60,000 or more, more preferably, 75,000 or more. The Mw of the SAN and, desirably, any additional polymer in the polymer foam is generally 300,000 or less, preferably 250,000 or less, and more preferably 150,000 or less. Additionally, it is desirable for 90% or more, preferably all of the polymers in the polymer foam to have a Mw of less than 1,000,000. If the SAN Mw is too low the SAN has insufficient physical strength to provide foam integrity. If the SAN Mw is too high, the gel viscosity of the SAN is so high that it is difficult to foam, particularly at economically attractive rates. For the same reasons, Mw for any other polymer desirably falls in the specified Mw ranges.

If SAN accounts for less than 100 wt % of the thermoplastic polymer composition, the balance of thermoplastic polymer composition can be selected from any thermoplastic polymer or polymers. Desirably, 50 wt % or more, preferably 75 wt % or more, more preferably 90 wt % or more, still more preferably 95 wt % or more, and possibly even 100 wt % of any balance of thermoplastic polymer composition in addition to SAN is an alkenyl aromatic polymer. Desirably, the alkenyl aromatic polymer is selected from a group consisting of polystyrene, styrene-alpha-methyl styrene copolymer, styrene-maleic anhydride copolymer, styrene-acrylic-acid copolymer and combinations thereof. One desirable thermoplastic polymer for use in the present process in the present foam comprises 95 wt % or more, even 100 wt % of a combination of SAN and polystyrene based on thermoplastic polymer composition weight.

The concentration of polymerized acrylonitrile (AN) in the thermoplastic polymer composition, regardless whether the thermoplastic polymer is entirely SAN or a combination of SAN with one or more other polymers, is desirably one wt % or more, preferably ten wt % or more and desirably 35 wt % or less and preferably 20 wt % or less based on total thermoplastic polymer composition weight. If the AN concentration is less than one wt % then it is difficult to prepare a quality foam with eight wt % or more chlorine-free HFC based on foam weight. If the AN concentration exceeds 35 wt % then the weight-averaged molecular weight (Mw) of the SAN must be so low to allow foam processability that the resulting foam will tend to have undesirably low strength and high friability.

The foamable polymer composition further comprises a blowing agent composition comprising one or more chlorine-free hydrofluorocarbon ("Cl-free HFC"). The Cl-free HFC is less soluble in polystyrene than 1,1,2,2-tetrafluoroethane (HFC-134) and can have a solubility in polystyrene equal to or less than 1,1,1,2-tetrafluoroethane (HFC-134a). Determine solubility of the Cl-free HFC in polystyrene at a temperature between 100 degrees Celsius (° C.) and 200° C., preferably between 25° C. and 200° C. The range of 100° C.-200° C. represents a range where most alkenyl aromatic polymers will be in their molten state during a foaming process. The broader range of 25° C.-200° C. further addresses the solubility of the blowing agent in the solid state polymer. Determine solubility via the Flory-Huggins equation for phase equilibria in polymer solutions according to the method described in WO 98/03581 (incorporated herein by reference). Determine solubility in polystyrene at a pressure between one and 100 bar (one and 98 atmospheres). A pressure range of one to 100 bar corresponds to pressure range experiences at and just after a foaming die in a typical foaming process.

Examples of suitable Cl-free HFCs having the requisite solubility in polystyrene include 1,1,1,2-tetrafluoroethane (HFC-134a); difluoromethane (HFC-32); fluoroethane (HFC-161); 1,1,1-trifluoroethane (HFC-143a); and pentafluoroethane (HFC-125). HFC-134a is a particularly desirable Cl-free HFC with respect to the present invention due to its low thermal conductivity and global availability.

The total concentration of all such Cl-free HFCs having a solubility in polystyrene less than HFC-134 and that can have a solubility equal to or less than HFC-134a is more than 30 wt %, preferably 40 wt % or more, more preferably 50 wt % or more, still more preferably 75 wt % or more based on total blowing agent weight in the foamable composition. The blowing agent composition may consist of the Cl-free HFC (that is, the Cl-free HFC may be present at a concentration of 100 wt % of the blowing agent composition). The Cl-free HFC is also present at a concentration of eight wt % or more, and can be present at a concentration of nine wt % or more, even ten wt % or more based on thermoplastic polymer composition weight. Typically, the Cl-free HFC is present at a concentration of 20 wt % or less, preferably 18 wt % or less and most preferably 15 wt % or less based on thermoplastic polymer composition weight. The Cl-Free HFC provides a thermally insulating gas in the foam that is also environmentally friendly.

The blowing agent composition may comprise additional blowing agents different from and in combination with the one or more Cl-free HFC. Suitable additional blowing agents include one or more selected from a group consisting of inorganic gases such as carbon dioxide, argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated aliphatic hydrocarbons having from one to five carbons, preferably that are chlorine-free (for example, difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

One desirable blowing agent composition comprises a combination of 50 wt % or more Cl-free HFC that has a lower solubility in polystyrene than HFC-134 and 50 wt % or less of one or more additional blowing agent. For example, one desirable blowing agent composition contains 50 wt % or more HFC-134a with the balance being a combination of HFC-152a and water or HFC-32 and water.

Other exemplary blowing agent compositions include combinations of HFC-134a, carbon dioxide and water; HFC-134a, carbon dioxide and ethanol; and HFC-134a, iso-butane, carbon dioxide and water.

Blowing agent composition is desirably present in the foamable mixture in a concentration range of 0.08 moles of blowing agent per hundred grams of polymer resin (mph) or more, preferably 0.1 mph or more, more preferably 0.12 mph or more and typically 0.3 mph or less, preferably 0.2 mph or less, still more preferably 0.18 mph or less. If the blowing agent composition is present at a concentration below 0.08 mph, the resulting polymer foam tends to have an undesirably high density. If the blowing agent composition is present at a concentration greater than 0.3 mph, the foam tends to suffer from one or more of the following: blow holes; pre-foaming, increase in open cell content, foam collapse and/or poor skin quality.

The foamable mixture may comprise additives in addition to the thermoplastic polymer and blowing agent. Suitable additives include infrared attenuating agents (for example, all types of carbon black, graphite, titanium dioxide and metal flake), clays such as natural absorbent clays (for example, kaolinite and montmorillonite) and synthetic clays; nucleating agents (for example, talc and magnesium silicate); flame retardants (for example, brominated flame retardants such as hexabromocyclododecane and tetrabromobisphenol A bis(2, 3-dibromopropyl)ether, phosphorous flame retardants such as triphenylphosphate, and flame retardant packages that may include synergists such as, for example, dicumyl and polycumyl); lubricants (for example, calcium stearate and barium stearate); colorants and dyes; and acid scavengers (for example, magnesium oxide and tetrasodium pyrophosphate). Additional additives may account for up to 20 wt % of the foamable mixture's total weight.

The process includes any method of extruding including continuous extrusion processes and semi-continuous (accumulative extrusion) processes. The process may extrude a plank through a die having a single opening or extrude multiple strands that coalesce into a coalesced strand foam plank (that is, a strand foam process).

Accumulative extrusion processes comprise: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam. U.S. Pat. No. 4,323,528, incorporated herein by reference, discloses such a process in a context of making polyolefin foams.

The process of the present invention surprisingly produces high quality foam despite having a high concentration (greater than 8 wt % based on thermoplastic polymer composition weight) of a Cl-free HFC having a lower solubility in polystyrene than HFC-134 at a temperature between 100 degrees Celsius (° C.) and 200° C., preferably between 25° C. and 200° C.

Typically, a low solubility HFC at such a concentration would be expected to create an open cell foam (see, C. Vachon and R. Gendron, "Foaming Polystyrene with Mixtures of Carbon Dioxide and HFC-134a", *CELLULAR POLYMER*, 22(2) 2003, 75-87; incorporated herein by reference) and even rapidly expand out of a foamable mixture to create blowholes. (see, for example, WO 98/03581 page 12, lines 22-27; incorporated herein by reference). Blowholes are voids the size of multiple cell diameters and are easily observed by the naked eye. Blowholes often cause an undesirably irregular foam surface as the blowing agent rapidly erupts through the foam surface during the foaming process. Nonetheless, the process of the present invention surprisingly produces a quality foam—that is, a foam that is close-celled, has a density of 48 kilograms per cubic meter or less and that desirably is free of blowholes and desirably has a good skin quality. The process also has the ability to produce a quality foam having an average cell size of 0.05 millimeters (mm) or more, preferably 0.1 mm or more, more preferably 0.2 mm or more. Typically, the quality foam has an average cell size of 1 mm or less. The surprising foam produced by the present process is a foam of the present invention.

Polymer Foam

The polymer foam of the present invention comprises a thermoplastic polymer composition defining a plurality of cells therein. The thermoplastic polymer composition is as described prior for the process of the present invention.

The polymer foam has at least one "primary surface". A "primary surface" has a planar surface area equal to the highest planar surface area of any surface of the foam. Typically, a surface opposing a primary surface is also a primary surface. A "planar surface area" corresponds to the area of a projection of a foam surface onto a plane.

The polymer foam of the present invention is a close-celled foam, having 30 percent (%) or less, preferably 20% or less, more preferably ten percent or less, still more preferably five percent or less and can have zero percent open cell content according to American Society for Testing and Materials (ASTM) method D6226-05.

The polymer foam of the present invention contains one or more Cl-free HFC that has a lower solubility in polystyrene than HFC-134 and can have a solubility equal to or less than HFC-134a. Determine solubility of the Cl-free HFC in polystyrene at a temperature between 100° C. and 200° C., preferably between 25° C. and 200° C., as described above. The total concentration of Cl-free HFC is eight wt % or more, and can be, nine wt % or more, even ten wt % or more, based on total foam weight. Typically, the concentration of Cl-free HFC in the foam is 20 wt % or less, based on total foam weight. Suitable Cl-free HFCs having the requisite solubility in polystyrene are listed above in regards to the process of the present invention. Preferred Cl-Free HFCs for use in the process are also preferred in the polymer foam of the present invention.

The polymer foam of the present invention desirably has a density of 48 kilograms per cubic meter ($kg/m^3$) or less, preferably 40 $kg/m^3$ or less, more preferably 35 $kg/m^3$ or less, still more preferably 32 $kg/m^3$ or less. The foam is useful as a thermal insulator and lower density foams generally have lower thermal conductivities than similar higher density foams. The foam also desirably has a density of 16 $kg/m^3$ or greater in order to ensure mechanical integrity during handling and use. Measure foam density according to ISO method 845-85.

The polymer foams of the present invention have a low thermal conductivity which makes it particularly useful as a thermal insulating material. Foams of the present invention can demonstrate thermal conductivity values of 32 milliwatts per meter-Kelvin (mW/m*K) or less, preferably 31 mW/m*K or less, even more preferably 30 mW/m*K or less. Measure thermal conductivity according to method EN 8301.

Desirably, the polymer foam has a good skin quality. A foam has a good skin quality if 98% or more, preferably 99% or more, most preferably 100% of any 200 square-centimeter portion of any primary surface of the foam that is centered on the foam's primary surface and extending to 80% of the foam's width is free of defects. A "defect" is a discontinuity in polymer that provides access to more than one cell of the foam through a primary surface of the polymer foam. Defects are apparent directly out of the foaming die and generally have non-uniform, irregular shapes and are distinct from intentionally milled grooves or slices introduced into a foam after a foaming die, which generally have uniform specific shapes. The foam of the present invention is also desirably free of blow holes.

The polymer foam also desirably has an average cell size of 0.05 mm or more, preferably 0.1 mm or more, more preferably 0.2 mm or more. Typically, the polymer foam has an average cell size of 1 mm or less. Determine average cell size according to ASTM method D-3756.

The polymer foam may contain additives. Suitable additives include infrared attenuating agents (for example, all types of carbon black, graphite, titanium dioxide and metal flake), clays such as natural absorbent clays (for example, kaolinite and montmorillonite) and synthetic clays (for example, fluoromica); nucleating agents (for example. talc and magnesium silicate); flame retardants (for example, brominated flame retardants such as hexabromocyclododecane and tetrabromobisphenol A bis(2,3-dibromopropyl)ether, phosphorous flame retardants such as triphenylphosphate, and flame retardant packages that may include synergists such as, for example, dicumyl and polycumyl); lubricants (for example, calcium stearate and barium stearate); colorants and dyes; and acid scavengers (for example, magnesium oxide and tetrasodium pyrophosphate). Additional additives may account for up to 20 wt % of the foam's total weight.

Use

The foam of the present invention is particularly useful as a thermal insulating material. In that regard, one method for using the foam of the present invention is to position the polymer foam between two areas where one of the two areas experiences a different temperature than the other and such that the polymer foam can serve as a thermal insulator between the two areas. For example, a method of use may involve placing the foam of the present invention between the inside and outside of a house. In such an example the foam insulates the inside of the house from temperature fluctuation occurring outside of the house.

The foam of the present invention advantageously provides high thermal insulation value as well as little risk to the atmosphere, both at least partially due to the presence of the Cl-free HFC.

EXAMPLES

The following examples serve to further illuminate particular embodiments of the present invention.

HFC-134a has a lower solubility in polystyrene than 1,1,2,2-tetrafluoroethane (HFC-134) within a temperature range of 25° C.-200° C. at pressures between one and 100 bar (see, for example, WO98/03581 at page 9, line 35 through page 14, line 12; incorporated herein by reference).

Examples 1-3 and Comparative Examples A-B

Prepare Example (Ex) 1, 2 and 3 using a thermoplastic polymer composition consisting of SAN having a Mw of 118,000 and an AN concentration of 15 wt % based on SAN weight. Feed the SAN into an extruder at a mixing temperature of about 200° C. to form a melt. Mix into the melt 1,1,1,2-tetrafluoroethane (HFC-134a) to form a foamable mixture. The concentration of HFC-134a and the mixing pressure is indicated in Table 1. Cool the foamable mixture to a foaming temperature of about 135° C. Expel the foamable mixture through a slit die at a rate of five pounds (2.27 kilograms) per hour and a gap spacing of 1/16-1/8 inch (1.6-3.2 millimeters) into atmospheric pressure and allow to expand into foam. Table 1 identifies physical properties for Examples 1-3.

Prepare Comparative Example (Comp Ex) A and B in like manner as Examples 1-3 except using a thermoplastic polymer composition consisting of polystyrene having a Mw of 170,000 and Mw/Mn of 2.22 according to the parameters shown in Table 1. Table 1 also identifies physical properties for Comparative Examples A and B.

TABLE 1

| | Ex 1 | Ex 2 | Ex 3 | Comp Ex A | Comp Ex B |
|---|---|---|---|---|---|
| HFC-134a concentration (wt % of thermoplastic polymer composition) | 8 | 10 | 12 | 8 | 10 |
| Mixing Pressure (bar) | 272 | 190 | 152 | 250 | 188 |
| Foam Density ($kg/m^3$ per ISO method 845-85) | 59.2 | 40.2 | 37.9 | 62.1 | 56.5 |
| Open Cell Content (% per ASTM D6226-05) | 4.1 | 6.3 | 5.0 | 36.9 | 65.1 |
| Average Cell Size (mm per ASTM method D-3756) | 0.41 | 0.10 | 0.03 | 0.03 | 0.02 |

Example 1-3 each illustrate an extruded polymer foam of the present invention and a process for preparing an extruded polymer foam of the present invention wherein 100 wt % of the thermoplastic polymer composition is SAN. Each of the Examples has an open cell content less than 10 wt % and contains at least 8 wt % of an HFC having a solubility in polystyrene less than that of HFC-134 in a temperature range of 25-200° C. and at a pressure between one to 100 bar. Each of Examples 1-3 has a good skin quality (that is, 98% or more of any 200 square-centimeter portion of any primary surface of the foam that is centered on the foam's primary surface and extending to 80% of the foam's width is free of defects). Each of Examples 1-3 is also free of blow-holes.

In contrast, Comp Exs A and B illustrate that an open celled foam (greater than 30% open-cell content) results when the thermoplastic polymer composition consists of polystyrene and the remaining conditions are similar to those for Examples 1-3. In particular, compare Ex 1 with Comp Ex A and Ex 2 with Comp Ex B.

Examples 4-6

Prepare Examples 4-6 using a thermoplastic polymer composition consisting of SAN having a Mw between 118,000 and 131,000 and an AN concentration of 15 wt % based on SAN weight. Feed the SAN into an extruder at a mixing temperature of about 200° C. to form a melt. Add to the melt the following additives: 0.15 wt % barium stearate, 0.28 wt % linear low density polyethylene and 0.85 wt % of hexabromocyclododecane; wt % based on SAN weight. Then, mix into the melt blowing agent composition consisting of blowing agents selected from HFC-134a, 1,1,1,3,3-pentafluorobutane (HFC-365mfc), carbon dioxide, and water at a mixing temperature and pressure (see Table 2 for details). Cool the foamable mixture to a foaming temperature of about 130° C. Expel the foamable mixture through a slit die into atmospheric pressure as in Examples 1-3. The foamable mixture expands into the foams of Examples 4-6. Table 2 identifies physical properties for Examples 4-6.

TABLE 2

| | Ex 4 | Ex 5 | Ex 6 |
|---|---|---|---|
| HFC-134a (Wt % of blowing agent/Wt % of Foam) | 79/8 | 84/9 | 70/8 |
| HFC-365mfc (Wt % of blowing agent/Wt % of Foam) | 0/0 | 0/0 | 17/2 |
| Carbon dioxide (Wt % of blowing agent/Wt % of Foam) | 11/1.1 | 7/0.75 | 4/0.5 |
| Water (Wt % of blowing agent/Wt % of Foam) | 10/1 | 9/1 | 9/1 |

TABLE 2-continued

| | Ex 4 | Ex 5 | Ex 6 |
|---|---|---|---|
| Mixing Pressure (bar) | 134 | 137 | 132 |
| Foam Density (kg/m$^3$ per ISO method 845-85) | 30.1 | 30.5 | 31.7 |
| Open Cell Content (% per ASTM D6226-05) | 0 | 0 | 0 |
| Thermal Conductivity after 90 days (mW/m * K per method EN 8301) | 27.7 | 26.9 | 27.3 |
| Average Cell Size (mm per ASTM method D-3756) | 0.32 | 0.31 | 0.34 |

Examples 4-6 illustrate processes and foam of the present invention that utilize a combination of blowing agents in addition to a chlorine-free HFC having a solubility in polystyrene less than that of HFC-134 in a temperature range of 25-200° C. and both at equilibrium pressure and in a pressure range of one to 100 bar. Each of Examples 4-6 has a good skin quality (that is, 98% or more of any 200 square-centimeter portion of any primary surface of the foam that is centered on the foam's primary surface and extending to 80% of the foam's width is free of defects). Examples 4-6 are also free of blow holes.

The invention claimed is:

1. A process for preparing extruded polymer foam comprising the steps:

(a) preparing a foamable mixture of a thermoplastic polymer composition and blowing agent composition at a mixing temperature and mixing pressure in a range of 13.2 to 19.0 megaPascals;

(b) cooling the foamable mixture to a foaming temperature; and (c) exposing the foamable mixture to an environment at a lower pressure than the mixing pressure and allowing the foamable mixture to expand into a polymer foam;

wherein, more than 95 wt % of the thermoplastic polymer composition is one or more styrene-acrylonitrile copolymer and wherein 1,1,1,2-tetrafluoroethane is present at a concentration of more than 30 weight-percent based on total blowing agent composition weight and at least eight weight-percent and 12 weight-percent or less based on thermoplastic polymer composition weight and wherein the polymer foam of step (c) is an extruded polymer foam comprising a thermoplastic polymer composition defining a plurality of cells therein, characterized by: (i) more than 95 weght-percent of the thermoplastic polymer composition is a styrene-acrylonitrile copolymer; (ii) having less than 30% open cell content according to ASTM method D6226-05; (iii) having a density of 48 kilograms per cubic meter or less according to ISO method 845-85; and (iv) containing at least eight weight-percent and 12 weight-percent or less, based on total foam weight, of 1,1,1,2-tetrafluoroethane.

2. The process of claim 1, wherein the thermoplastic polymer composition is one or more styrene-acrylonitrile copolymer.

3. The process of claim 1, wherein the thermoplastic polymer composition contains one weight-percent or more and 35 weight-percent or less of copolymerized acrylonitrile based on thermoplastic polymer composition weight.

4. The process of claim 1, wherein the blowing agent composition consist of 50 weight-percent or more of 1,1,1,2-tetrafluoroethane and up to 50 weight-percent of a co-blowing agent selected from a group consisting of carbon dioxide, water, hydrocarbons having from one to seven carbons, alcohols having from two to five carbons, ether and ketones having from two to four carbons.

5. The process of claim 1, wherein the blowing agent composition consists of 1,1,1,2-tetrafluoroethane.

6. The process of claim 1, wherein the polymer foam has an open-cell content of less than 30 percent according to ASTM method D6226-05 and has a density of 32 kilograms per cubic meter or less according to ISO method 845-85.

7. The process of claim 6, wherein the polymer foam has an average cell size of 0.1 millimeters or more according to ASTM method D-3756.

8. The process of claim 1, wherein the concentration of 1,1,1,2-tetrafluoroethane is nine weight-percent or more and 12 weight-percent or less based on thermoplastic polymer composition weight.

* * * * *